United States Patent [19]

Kosarin et al.

[11] 4,225,624
[45] Sep. 30, 1980

[54] PROCESS FOR REDUCING CALORIC CONTENT OF COCONUT

[76] Inventors: Norman D. Kosarin, 60 E. End Ave., New York, N.Y. 10028; Gilbert Finkel, 6 Jagged Rock Rd., Parsippany, N.J. 07054

[21] Appl. No.: 937,608

[22] Filed: Aug. 28, 1978

Related U.S. Application Data

[63] Continuation-in-part of Ser. No. 882,229, Feb. 28, 1978, abandoned, which is a continuation of Ser. No. 707,659, Jul. 22, 1976, abandoned.

[51] Int. Cl.³ .............................................. A23G 3/00
[52] U.S. Cl. ..................................... 426/93; 426/429; 426/430; 426/617; 426/804; 426/660
[58] Field of Search ............... 426/429, 430, 617, 804, 426/93, 660

[56] References Cited

U.S. PATENT DOCUMENTS

| | | | |
|---|---|---|---|
| 1,374,879 | 4/1921 | Cookson et al. | 426/617 |
| 1,374,880 | 4/1921 | Cookson et al. | 426/617 |
| 3,271,160 | 9/1966 | Kopas et al. | 426/430 |
| 3,295,985 | 1/1967 | Cavanaugh | 426/430 |
| 3,671,266 | 6/1972 | Cooper et al. | 426/93 |
| 3,721,569 | 3/1973 | Steinkraus | 426/430 |
| 3,876,811 | 4/1975 | Bonner et al. | 426/93 |
| 4,008,210 | 2/1977 | Steele et al. | 426/430 |
| 4,049,833 | 9/1977 | Gannis et al. | 426/804 |
| 4,053,650 | 10/1977 | Chino et al. | 426/93 |

OTHER PUBLICATIONS

Arsdale et al., Candy Recipes and Other Confections, Blue Ribbon Books, Garden City, N. J. 1941, pp. 118–120.
Daniel, Up-to-14 Date-14 Confectionery, MacClaren & Sons Ltd. Davis House, Croydon, Surrey. Eng. 1965, p. 370.

*Primary Examiner*—Jeanette M. Hunter
*Attorney, Agent, or Firm*—Staas & Halsey

[57] ABSTRACT

A process for reducing the caloric content of edible items such as coconut is disclosed wherein substantially all of the fat is removed by a solvent and subsequent removal of soluble polysaccharides may be accomplished by washing the defatted item in water. The described process, causes the caloric content of the item to be reduced by approximately 100%. The process is used with edible items containing fat and/or sugar selected from the group consisting of the edible meat of nuts, the edible seeds of grain, and the edible seeds of fruits. Coconut, treated by the aforesaid process, is used in the manufacture of candy or other foods having a reduced caloric content. The other defatted edible items may be similarly used in the manufacture of candy or other foods having a reduced caloric content.

5 Claims, No Drawings

PROCESS FOR REDUCING CALORIC CONTENT OF COCONUT

This application is a Continuation-In-Part of Continuation Application Ser. No. 882,229, filed on Feb. 28, 1978 now abandoned which is a Continuation of Application Ser. No. 707,659, filed on July 22, 1976 now abandoned.

BACKGROUND OF THE INVENTION

1. Field of the Invention:

The present invention is directed to a process for reducing the caloric content in natural coconut, and other fatty edible items such as the edible meats of nuts, the edible seeds of grain, and the edible seeds of fruits.

2. Description of the Prior Art:

The use of shredded coconut in candy is well known in the prior art. However, due to the high caloric content of coconut, it has been found unsuitable for use in candies having a caloric content of less than 100 calories/ounce (353 calories/100 grams). Since natural coconut contains approximately 196 calories/ounce (690 calories/100 grams) the use of natural coconut in a chocolate covered candy (assuming the covering constitutes approximately 25%), results in a caloric content of approximately 175 calories/ounce (617 calories/100 grams).

It is generally known that processing of nut meats for the reduction of caloric content therein may be performed by applying high pressure and mild heat to thereby "roast" the fat from the nut meats. The aforesaid roasting method is only effective to reduce the caloric content to approximately 50% and is therefore not suitable for the treatment of coconut wherein a 80-100% reduction in caloric content is sought.

Other edible items containing fat also are useful in candy as well as other food products, but due to the high caloric content have been found unsuitable for use in low caloric content food products.

SUMMARY OF THE INVENTION

The process of the present invention has the advantage of extracting approximately 100% of the fat from coconut and thereby reducing the caloric content thereof approximately 70-90%. The process of the present invention also has the advantage of further reducing the caloric content by removing the sugar (soluble polysaccharides) therefrom while leaving the appearance and texture of the coconut substantially unchanged as compared to the natural coconut.

The process of the present invention also can be used to extract approximately 100% of the fat from other edible items containing fat, as well as also removing the sugar (soluble polysaccharides) therefrom to further reduce the caloric content thereof. It has been discovered that the seed or food resembling seed of the cereal grasses such as oats, barley, wheat, and corn can be treated by the process of the present invention to substantially reduce the overall caloric content thereof. Similarly, the edible meats of nuts such as peanuts, filberts, cashews, walnuts, etc. may similarly be treated by the process of subject invention to substantially reduce the caloric content thereof. Also, the edible seeds of fruits which include legumes such as beans, peas, soybeans, etc. and caraway, sunflowers, and chestnuts may be similarly treated.

The process of the present invention is useful with edible nuts, seeds, and fruit items containing fat and sugar.

It is an object of the present invention to provide a process for reducing the caloric content of coconut without affecting the appearance and texture thereof.

It is another object of the present invention to provide a simplified process for defatting coconut wherein said process is performed at a moderate temperature and at atmospheric pressure.

It is a further object of the present invention to provide a process for manufacturing food items utilizing the defatted coconut.

Another object of the present invention is to provide a process for reducing the caloric content of edible items containing fat and sugar selected from the group consisting of the edible meats of nuts, the edible seeds of grains, and the edible seeds of fruits.

A still further object of the invention is to provide a process for reducing the caloric content of edible meats of nuts such as peanuts, filberts, cashews, walnuts, coconuts, almonds, and similar meats of nuts having substantial amounts of fat and/or sugar.

An additional further object of the present invention is to provide a process for reducing the caloric content of the edible seeds of grains such as oats, barley, wheat, rice, corn, millet, and other seeds of cereal grasses having fat and sugar therein.

A still further additional object of the present invention is to provide a process for reducing the caloric content of the edible seeds of fruits such as caraway, sunflower, chestnuts, and including legumes such as beans, peas, soybeans and similar fruits having fat and sugar therein.

DESCRIPTION OF THE PREFERRED EMBODIMENTS

A preferred embodiment of the subject invention process for reducing the caloric content in coconut as well as other edible items, is made up of two sequential process steps wherein the second step is optional and is effective to further reduce the caloric content of the coconut or other edible items by removing the soluble sugar therefrom.

EXAMPLE

One part by weight shredded coconut is mixed with two parts by weight of solvent, such as petroleum ether, and is heated to a temperature of approximately 180° F. (82° C.). The heated mixture is maintained at approximately standard atmospheric pressure and is agitated for a period of approximately eight hours in a "soxhlet" type extractor to separate the solvent containing the fat from the defatted coconut. As a result of this first process step, the coconut is completely defatted and the caloric content is reduced by approximately 70-90%. (Of course the above example parameters may be adjusted to remove lesser amounts of fat from the coconut.) The remaining caloric content of the coconut is contributed by the sugar retained within the defatted coconut.

It has further been discovered that the sugar may also be extracted from the defatted coconut by washing the defatted coconut in water (preferably distilled water). The washing of the defatted coconut removes up to 100% of the soluble sugar and thereby reduces the caloric content of the defatted coconut to trace amounts.

A major advantage of the aforesaid process for reducing the caloric content of coconut is that the appearance and texture of the defatted coconut remains substantially unchanged from that of the natural coconut.

It should be noted that while the aforesaid example, of reducing the caloric content of coconut, used shredded coconut, larger pieces of coconut may be equally treated by the aforesaid process. However, larger pieces will necessarily require larger amounts of time to obtain a total extraction of the fat therefrom.

It should be further noted that although the aforesaid example utilized a solvent such as petroleum ether, other solvents such as ethyl ether, alcohol ether, or ethyl alcohol may also be used.

While the foregoing example is for the reduction of the caloric content of coconut, it has been discovered that other edible items which contain fat and/or sugar also may be reduced in caloric content by the same process. Thus, edible items such as the meats of nuts including peanuts, cashews, filberts, walnuts, almonds and the like, also may be substantially reduced in fat and/or sugar content. The edible seeds of the grains and cereal grasses also may be treated with this process. Edible items such as the seeds of oats, barley, wheat, millet, corn and the like can be substantially reduced in caloric content. Similarly, the edible seeds of fruits which include the legumes of peas, beans, soybeans, and the like, as well as chestnuts, caraway seeds, sunflower seeds, apples, cherries, plums, oranges, also may be treated by this process to substantially reduce the caloric content thereof.

Similarly, to the use of the coconut of reduced caloric content, any of the above edible items may be used in making candies and other food products after having the fats and/or sugars substantially removed therefrom by the process of subject invention.

It has also been discovered that the length of time of treatment for all of these listed edible items is substantially the same as for that of coconut. It has been discovered that the amount of extraction of fats by the solvent used depends more upon the proportion, that is, one part by weight of edible item mixed with two parts by weight of solvent for a reduction of approximately 70-90% of the caloric content of the edible item.

The use of the defatted coconut, or other edible items, produced by the above process is seen as highly desirable in the manufacture of candies and other foods having a caloric content of less than 100 calories/ounce (353 calories/100 grams). The following process is an example of using the defatted coconut to produce a candy having a relatively low calorie content while tasting and appearing to have natural shredded coconut in the center thereof.

EXAMPLE 63.4 grams of defatted coconut (as produced in the aforesaid process) is mixed with 263.9 grams of invert syrup (71% solids), 225.8 grams water, 4.2 grams agar (a thickening agent) and 1 gram of imitation flavor (such as that manufactured by Bush, Boake, Allen, No. C 9527), in solution. The solution is cooked until the excess water is boiled off. The cooked mixture is then poured onto a cold table where it is stirred periodically until it cools to approximately 103° F. (43° C.). The mixture is then cooled to room temperature and cut to the desired sizes. Subsequently, the cooled mixture is coated with sweetened chocolate so that each piece of candy comprises approximately 25% by weight of chocolate. The candy resulting from the aforesaid process contains approximately 75 calories/ounce (265 calories/100 grams).

Compared with conventional chocolate bars, which contain approximately 130 calories/ounce (458 calories/100 grams), and conventional chocolate covered coconut candies, which contain approximately 175 calories/ounce (617 calories/100 grams), the aforesaid chocolate covered candy produced by the process of the present invention, results in an improved food product having a significant reduction in calories over the candy of the prior art.

Any of the other edible items after having their caloric content there reduced by the process of this invention, can also be used in candies similar to the above example. Also, they may be used in other type food stuffs other than candy, whenever the reduced caloric content thereof is important.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. A process for producing a food product having a reduced caloric content, comprising the steps of:
   providing a first quantity of coconut;
   providing a second quantity of solvent;
   mixing said first quantity of coconut and said second quantity of solvent;
   heating said mixture at a temperature up to approximately 82° C. in a standard atmospheric condition for 8 hours to cause said solvent to dissolve substantially all the fat in said coconut while retaining flavor; and
   separating said defatted coconut from said solvent;
   and further including the additional steps of mixing a predetermined amount of said defatted coconut with predetermined amounts of edible materials including invert syrup, a thickening agent, and water;
   cooking said mixture until excess water is evaporated;
   cooling said cooked mixture; and
   coating said cooled cooked mixture with sweetened chocolate to form a candy of approximately 25% by weight sweetened chocolate and having a caloric content of less than 100 calories/ounce (353 calories/100 grams).

2. A process as in claim 1, wherein said candy has a caloric content of approximately 75 calories/ounce (265 calories/100 grams).

3. A process as in claim 1, wherein said caloric content of said coconut is further reduced by washing said defatted coconut with water in a quantity suffucient to dissolve and extract soluble sugars from said defatted coconut.

4. A process as in claim 1, wherein said first quantity is one part by weight of said mixture and said second quantity is two parts by weight of said mixture.

5. An edible food product produced by the process of claim 1.